United States Patent
Eom et al.

(10) Patent No.: US 9,842,289 B2
(45) Date of Patent: Dec. 12, 2017

(54) MIDDLEWARE DEVICE, DRIVING METHOD OF READER AND METHOD FOR DETERMINING MISRECOGNITION OF TAG

(71) Applicant: SAMSUNG ELECTRONICS CO., LTD., Suwon-si, Gyeonggi-do (KR)

(72) Inventors: Seung-ook Eom, Yongin-si (KR); Seok-bae Son, Suwon-si (KR); Il-young Oh, Suwon-si (KR); Kyung-ho Yoo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/141,233

(22) Filed: Apr. 28, 2016

(65) Prior Publication Data

US 2017/0039465 A1    Feb. 9, 2017

(30) Foreign Application Priority Data

Aug. 3, 2015  (KR) .................. 10-2015-0109590

(51) Int. Cl.
*G06K 19/07*  (2006.01)
*H04W 4/02*  (2009.01)
(Continued)

(52) U.S. Cl.
CPC ..... *G06K 19/0723* (2013.01); *G06K 7/10019* (2013.01); *H04W 4/023* (2013.01); *H04K 3/25* (2013.01); *H04K 2203/20* (2013.01)

(58) Field of Classification Search
CPC ............. G06K 7/0008; G06K 19/0723; G06K 7/10366; G06K 7/10009; G06K 7/10316;
(Continued)

(56) References Cited

U.S. PATENT DOCUMENTS 7,804,455 B2 *  9/2010  Lee ................... H01Q 1/2216
                                                340/572.7
8,226,474 B2 *  7/2012  Nguyen ............... G07F 17/32
                                                463/29
(Continued)

FOREIGN PATENT DOCUMENTS

KR       10-0652022       12/2006
KR    10-2008-0051453      6/2008
(Continued)

OTHER PUBLICATIONS

Seong, L.J. et al., "A Study of 900 MHz Positive RFID Label Tag to Increasing the Recognition-rate in Tag Dense Environment", Ubiquitous Technology Research Center, Daegu University, 2010, pp. 251-252.
(Continued)

*Primary Examiner* — Mark Blouin
(74) *Attorney, Agent, or Firm* — Staas & Halsey LLP

(57) ABSTRACT

A middleware device, a driving method of a reader and a tag misrecognition determining method are provided. The middleware device operated in relation to a reader includes a storage configured to pre-store receiving sensitivity of tag information of a tag of an object recognized at different distances from the reader as a reference value, a communication interface configured to, in response to the object approaching to the reader, acquire the receiving sensitivity of tag information of the tag recognized at a preset time interval, and a tag misrecognition processor configured to compare the acquired receiving sensitivity with the pre-stored reference value to determine misrecognition of the tag.

17 Claims, 14 Drawing Sheets

(51) Int. Cl.
*G06K 7/10* (2006.01)
*H04K 3/00* (2006.01)

(58) Field of Classification Search
CPC ......... G06K 19/07749; G06K 19/0717; G06K 7/10356
USPC ...................................................... 340/10.1
See application file for complete search history.

(56) References Cited

U.S. PATENT DOCUMENTS

| | | | | |
|---|---|---|---|---|
| 8,634,796 | B2* | 1/2014 | Johnson | H04W 4/02 455/404.1 |
| 8,897,741 | B2* | 11/2014 | Johnson | H04W 4/02 370/331 |
| 8,988,199 | B1* | 3/2015 | Moretti | 235/383 |
| 9,111,157 | B2* | 8/2015 | Christopher | G06K 7/10376 |
| 9,378,601 | B2* | 6/2016 | Ricci | B60Q 1/00 |
| 9,406,220 | B2* | 8/2016 | Proud | H02J 7/025 |
| 2014/0167920 | A1* | 6/2014 | Kamiya | G01S 13/58 340/10.1 |

FOREIGN PATENT DOCUMENTS

| | | |
|---|---|---|
| KR | 10-1027125 | 4/2011 |
| KR | 10-1214650 | 12/2012 |
| KR | 10-2013-0053807 | 5/2013 |

OTHER PUBLICATIONS

Ahn, R.Y. et al., "An Effective Hybrid Anti-collision Algorithm using Collision Counter in Moving RFID System", College of Information and Communication Engineering, Sungkyunkwan University, 2013, pp. 438-439.

* cited by examiner

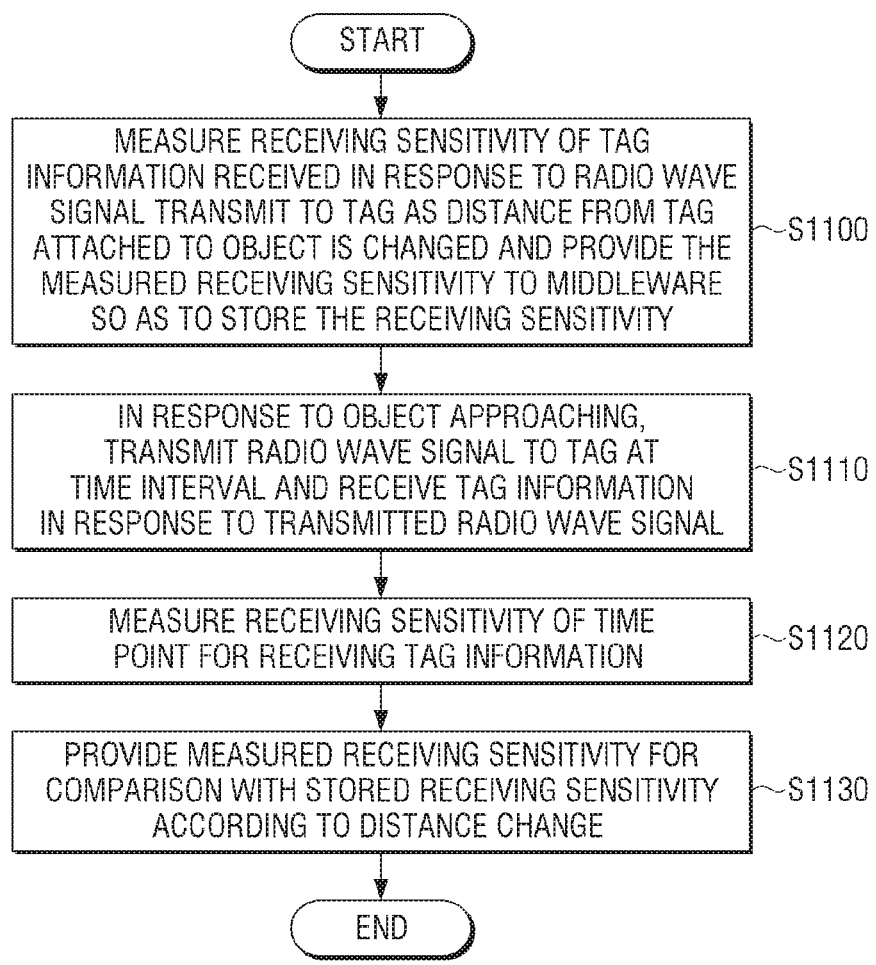

MIDDLEWARE DEVICE, DRIVING METHOD OF READER AND METHOD FOR DETERMINING MISRECOGNITION OF TAG

CROSS-REFERENCE TO RELATED APPLICATIONS

This application claims priority benefit from Korean Patent Application No. 10-2015-0109590, filed on Aug. 3, 2015, in the Korean Intellectual Property Office, the disclosure of which is incorporated herein by reference in its entirety.

BACKGROUND

1. Field

Apparatuses and methods consistent with the present disclosure relate to a middleware device, a driving method of a reader and a tag misrecognition determining method, and more particularly, a middleware device, a driving method of a reader and a tag misrecognition determining method, for overcoming misrecognition of a tag, for example, when passive radio frequency identification (RFID) technology is used.

2. Description of the Related Art

During commodity input, there are two methods for computerizing material information.

According to a first method, an operator compares and examines the number and state of delivered materials with the unaided eye and then scans barcodes of a physical distribution table to complete input processing in a system. When a barcode system is used, information needs to be directly input via short distance scanning without cumbersomeness of a manual operation for key-in of the human, thereby simplifying data input. In addition, although a barcode is simple, the barcode barely causes errors due to high reading reliability, is easily written, and is installed and maintained at relatively low costs.

However, it is disadvantageous that an operator for scanning needs to be always at a commodity flow channel and payment processing error is caused due to the operator mistake during simultaneous input of a large amount of goods. In addition, it is not possible to track materials in real time, and thus it is difficult to achieve systematic management such as a material commitment order through factory inventory check and interactive operations with a manufacturing line.

According to a second method, an RFID tag attached to a commodity and material is recognized in a non-contact manner and automatic input is completely performed using remote processing via a system. That is, the tag attached to a commodity is automatically read by an RFID reader installed at an entrance of a warehouse during input and information is transmitted to a related system so as to recognize an input situation in real time. Information is systematically processed and controlled so as to recognize states and positions of factory materials and to ensure physical distribution visibility, thereby remarkably production efficiency. In addition, the RFID system is advantageous to simultaneously recognize many tags, and thus the system provides an optimum physical distribution solution in a complex factory environment and is applicable to all processes such as manufacture, production, and physical distribution.

However, there is a limitation to apply the method to a physical distribution process according to misrecognition due to movement of moving objects (e.g., humans and things) or unpredicted electronic jamming signals generated in a factory environment, and thus problems arise in that an operator needs to additionally intervene in the method.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a middleware device, a driving method of a reader and a tag misrecognition determining method, for overcoming misrecognition of a tag, for example, when passive radio frequency identification (RFID) technology is used.

According to an aspect of the present disclosure, a method for determining tag misrecognition of a middleware device that is operated in relation to a reader includes pre-storing receiving sensitivity of tag information of a tag of an object recognized at different distances as a reference value, in response to the object approaching, acquiring receiving sensitivity of tag information of the tag recognized at a preset time interval, and comparing the acquired receiving sensitivity with the pre-stored reference value to determine misrecognition of the tag.

The pre-storing may include pre-storing a power amount of a back-scattering modulation signal provided via back-scattering and modulation in an opposite direction in response to a radio signal provided by the reader as the receiving sensitivity.

The determining of misrecognition of the tag may include determining normal recognition when a plurality of receiving sensitivities according to a distance pre-stored as the reference value and a plurality of receiving sensitivities according to the time interval are identical to each other.

The reader may transmit radio signals of the same strength irrespective of the distance and the time interval.

The pre-storing may include pre-storing receiving sensitivity for each channel, received according to the distance through a plurality of signal transmitting channels included in the reader, the acquiring of the receiving sensitivity of the tag information may include acquiring receiving sensitivity for each channel, received according to the time interval through the plurality of signal transmitting channels, and the determining of misrecognition of the tag may include comparing the pre-stored receiving sensitivity for each channel and the acquired receiving sensitivity for each channel to determine misrecognition of the tag.

The method may further include performing an operation for determining misrecognition of the tag by applying different weights to the respective channels.

The method may further include classifying the acquired receiving sensitivity in terms of time, and removing radio wave noise received together with the tag information, wherein the determining of misrecognition of the tag may include comparing the receiving sensitivity classified in terms of time, from which the radio wave noise is removed, with the pre-stored receiving sensitivity as the reference value.

The pre-stored receiving sensitivity and the acquired receiving sensitivity may each be measured by the reader and are provided to the middleware device.

According to an aspect of the present disclosure, a method for driving a reader that is operated in relation to a middleware device includes measuring receiving sensitivity of tag information of a tag of an object recognized at different distances and providing the measured receiving sensitivity as a reference value to the middleware device, in response to the object approaching, measuring the receiving sensitivity of the tag information of the tag recognized at a preset time interval, and providing receiving sensitivity measured according to the time interval to the middleware device for comparison with the reference value in order to determine misrecognition of the tag.

The reader may transmit radio signals of the same strength irrespective of the distance and the time interval.

A radio signal transmitted to the tag from the reader may be a linear polarization signal.

A radio signal transmitted to the tag based on the distance and the time interval may be transmitted through a plurality of signal transmitting channels included in the reader, and the tag information may be received as a response signal to the transmitted radio signal through the plurality of signal transmitting channels.

According to an aspect of the present disclosure, a middleware device operated in relation to a reader includes a storage configured to pre-store receiving sensitivity of tag information of a tag of an object recognized at different distances as a reference value, a communication interface configured to, in response to the object approaching, acquire receiving sensitivity of tag information of the tag recognized at a preset time interval, and a tag misrecognition processor configured to compare the acquired receiving sensitivity with the pre-stored reference value to determine misrecognition of the tag.

The storage may pre-store a power amount of a back-scattering modulation signal provided via back-scattering and modulation in an opposite direction in response to a radio signal provided by the reader as the receiving sensitivity.

The tag misrecognition processor may determine normal recognition when a plurality of receiving sensitivities according to a distance pre-stored as the reference value and a plurality of receiving sensitivities according to the time interval are identical to each other.

The reader may transmit radio signals of the same strength irrespective of the distance and the time interval.

The storage may pre-store receiving sensitivity for each channel, received according to the distance through a plurality of signal transmitting channels included in the reader, the communication interface may acquire receiving sensitivity for each channel, received according to the time interval through the plurality of signal transmitting channels, and the tag misrecognition processor may compare the acquired receiving sensitivity for each channel and the pre-stored receiving sensitivity for each channel to determine misrecognition of the tag.

The tag misrecognition processor may perform an operation for determining misrecognition of the tag by applying different weights to the respective channels.

The communication interface may remove radio wave noise received together with the tag information, and the tag misrecognition processor may classify the acquired receiving sensitivity from which the radio wave noise is removed and compares the receiving sensitivity classified in terms of time with the pre-stored receiving sensitivity as the reference value.

The pre-stored receiving sensitivity and the acquired receiving sensitivity may each be measured by the reader and are provided to the middleware device.

According to an aspect of the present disclosure, a reader operated in relation to a middleware device includes a communication interface configured to provide receiving sensitivity of tag information of a tag of an object recognized at different distances and receiving sensitivity of tag information of a tag recognized at a preset time interval in response to the object approaching to the middleware device, and a tag receiving sensitivity processor configured to measure receiving sensitivity according to the distance and the time interval and to control the communication interface to provide the measured receiving sensitivity to the middleware device in order to determine misrecognition of the tag.

The tag receiving sensitivity processor may control the communication interface to transmit radio signals of the same strength irrespective of the distance and the time interval.

The reader may further include an antenna for transmitting the radio signal, wherein a radio signal transmitted to the tag from the antenna may be a linear polarization signal.

The reader may further include a plurality of antennas connected to the communication interface, wherein the tag receiving sensitivity processor may transmit a radio signal to the tag based on the distance and the time interval through the plurality of antennas and receives tag information as a response signal to the transmitted radio signal through the plurality of signal transmitting channels.

According to an aspect of the present disclosure, a computer readable recording medium having a program for execution of a method for determining tag misrecognition of a middleware device operated in relation to a reader, the method including pre-storing receiving sensitivity of tag information of a tag of an object recognized at different distances as a reference value, in response to the object approaching, acquiring receiving sensitivity of tag information of the tag recognized at a preset time interval, and comparing the acquired receiving sensitivity with the pre-stored reference value to determine misrecognition of the tag based on a result of the comparing.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other aspects of the present disclosure will be more apparent by describing certain exemplary embodiments of the present disclosure with reference to the accompanying drawings, in which:

FIG. 11 is a flowchart illustrating a driving procedure of a reader according to an exemplary embodiment of the present disclosure;

DETAILED DESCRIPTION

Certain exemplary embodiments of the present disclosure will now be described in greater detail with reference to the accompanying drawings.

Figure 1:
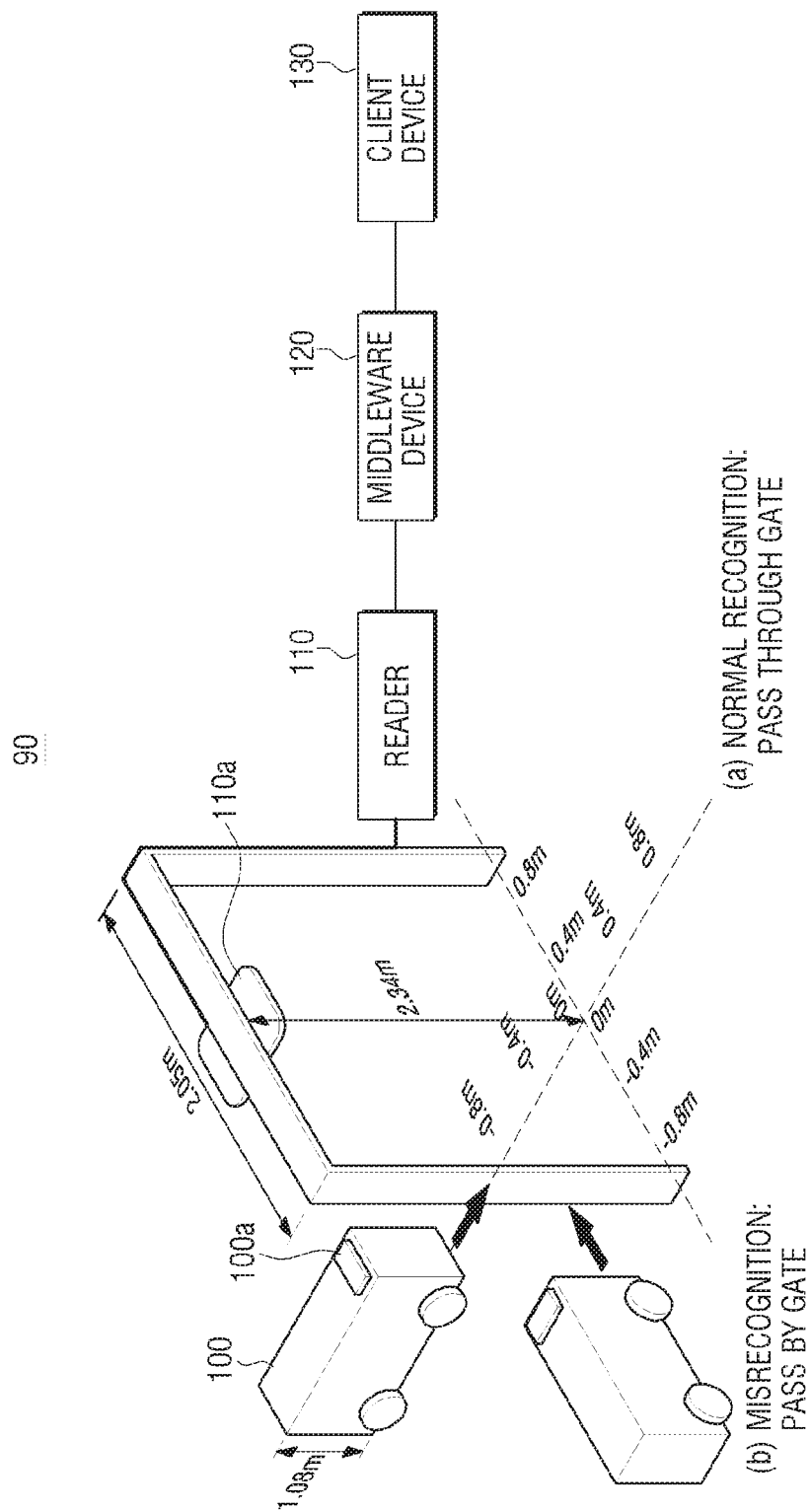
FIG. 1 is a diagram illustrating an information processing system according to a first exemplary embodiment of the present disclosure.

FIG. 1 is a diagram illustrating an information processing system 90 according to a first exemplary embodiment of the present disclosure.

As illustrated in FIG. 1, according to the first exemplary embodiment of the present disclosure the information processing system 90 may include some or all of a tag 100*a*, a reader 110, a middleware device 120, and a client device 130.

Here, inclusion of some or all of components refers to the case in which the middleware device 120 are omitted from system configuration or the middleware device 120 is integrally configured with the reader 110 and the client device 130, and hereinafter, the case in which all of the components are included will be described for a sufficient understanding of the present disclosure.

The tag 100*a* may be attached to, for example, a truck 100 for transport of materials in a product line. The tag 100*a* may be, for example, a passive radio frequency identification (RFID) that reads information of a chip and communicates with the chip using only power of the reader 110 and may include a built-in antenna and a chip. An RF signal transmitted from the reader 110 may be modulated and information of a recognition target product of the tag 100*a* may be transmitted to the reader 110. In other words, the tag 100*a* may generate power using a radio signal transmitted from the reader 110 and store the generated power in an internal capacitor. In addition, a modulated back-scattering signal as a response signal to the received radio signal may be provided to the reader 110 and tag information may be transmitted together during this process. Here, commodity related information stored in the tag 100*a* may be related to a material code, a produce line, product number, and so on. Here, modulated back-scattering signal may be reflected and provided in an opposite direction to a direction which the radio signal is provided from the reader 110, which is interpreted as being modulated, scattered, and provided.

The reader 110 may communicate with the tag 100*a* through, for example, an antenna 110*a* installed at a gate through which materials are input and output when the truck 100 with the tag 100*a* attached thereto approaches the reader 110. In other words, the reader 110 may transmit a radio signal, for example, an RF signal to supply power to the tag 100*a* and may inversely receive the unique identification code or information of the tag 100*a*. That is, it may be deemed that the reader 110 demodulates information received from the tag 100*a* to interpret ID information of the tag 100*a*. In order to perform the above function, the reader 110 may include a frequency generating device installed therein for generating a communication protocol and radio frequency for communication with the tag 100*a*.

The antenna 110*a* of the reader 110 may transmit the RF frequency generated through the reader 110 to the tag 100*a* and receive information from the tag 100*a*. In addition, according to an exemplary embodiment of the present disclosure, the antenna 110*a* may transmit a linear polarization signal to the tag 100*a* according to control of the reader 110. Accordingly, it may be deemed that the antenna 110*a* of the reader 110 communicates with the antenna installed in the tag 100*a* using the linear polarization signal. This may be useful to reduce misrecognition of the tag information.

The reader 110 may perform a predetermined measuring process after the information processing system 90 is established. In other words, in the predetermined measuring process, a system designer may measure receiving sensitivity of tag information (or tag) according to change in a distance from the tag 100*a* through the reader 110 and the measured value may be provided to the middleware device 120, as illustrated in FIG. 1. Here, the receiving sensitivity of the tag information may refer to a power amount of the modulation back scattering signal received from the tag 100*a* to the reader 110. For example, in response to the truck 100 approaching the reader 110 such that the tag 100*a* attached to the truck 100 enters a range of the reader, for example, a communication radius for communication with the reader 110, irrespective of an automatic operation of an automated system or a manual operation of a measurer, the reader 110 may measure the receiving sensitivity of tag information received as a response signal to the radio signal transmitted whether the distance from the tag 100*a* is changed and provide the receiving sensitivity to the middleware device 120. The receiving sensitivity may be measured by a firmware included in the reader 110. However, embodiments of the present disclosure are not particularly limited to software such as firmware. In other words, this is because that it is possible to configure a specific SW module of software as hardware. In order to measure receiving sensitivity, a radio signal transmitted to the tag 100*a* may be a signal of 900 MHz, and when a minimum of 0.01 W is supplied to the tag 100*a*, the tag 100*a* may provide the tag information as a response signal to the received radio signal. The above measurement procedure may also correspond to a kind of data establishing procedure.

Then, in an actual physical distribution environment, the reader 110 may recognize tags 100*a* attached to the truck 100 and classify materials that are input and output to and from a warehouse. To this end, in response to the truck 100 with the tag 100*a* attached thereto approaching the reader 110 within a communication radius or a range of the reader 110, the reader 110 may transmit a radio signal with a predetermined (or preset) time interval to the tag 100*a* and measure the receiving sensitivity of the tag information received as a response of the transmitted radio signal. For example, upon transmitting the radio signal and measuring the receiving sensitivity of the tag information in response to the truck 100 entering, the reader 110 may re-transmit the radio signal and measure receiving sensitivity of tag information about the radio signal, for example, after 1 second. In addition, a measured value obtained in the process, that is, each receiving sensitivity may be provided to the middleware device 120. The time interval may be changed by a system designer and thus is not particularly limited.

The middleware device 120 may pre-store receiving sensitivity that is measured and provided according to change in a distance by the reader 110 or measurement data related to the receiving sensitivity as a reference value. In addition, in the actual physical distribution environment, a measured value of receiving sensitivity of tag information provided by recognizing the tag 100*a* that is input and output to and from a warehouse may be acquired and compared with pre-stored receiving sensitivity receiving sensitivity related data so as to determine misrecognition of the tag 100*a*. For example, a value of the receiving sensitivity pre-stored as a reference value according to change in distance may be compared with the currently acquired value of receiving sensitivity. For example, when a plurality of values of receiving sensitivity are compared and the values are determined to be identical to each other or be within an error range, input and output processing is performed on a corresponding material. In other words, when the values are identical to each other, related tag information may be provided to the client device 130, and when the values are not identical to each other, the values may be filtered and deleted, which will be re-described later in detail. Describing in short, with regard to the middleware device 120 according to an exemplary embodiment of the present disclosure, the antenna 110*a* may be installed at an entrance of a path in which materials are loaded, and receiving sensitivity may be determined by the reader 110 or the middleware device 120 through tag information of the tag 100*a*, which is received to the antenna 110*a* during movement of the tag 100*a* so as to detect tag information that is normally transmitted via filtering.

The client device 130 may include a server or a computer. The client device 130 may be responsible for material distribution management. In other words, invalid information or duplicate information is processed, that is, filtered through the middleware device 120, and thus it may be deemed that physical distribution is managed based on the tag information provided by the middleware device 120.

As the above configuration result, the system 90 according to an exemplary embodiment of the present disclosure may enhance a recognition rate due to misrecognition of a conventional tag so as to stably process input and output events of materials.

Figure 2:
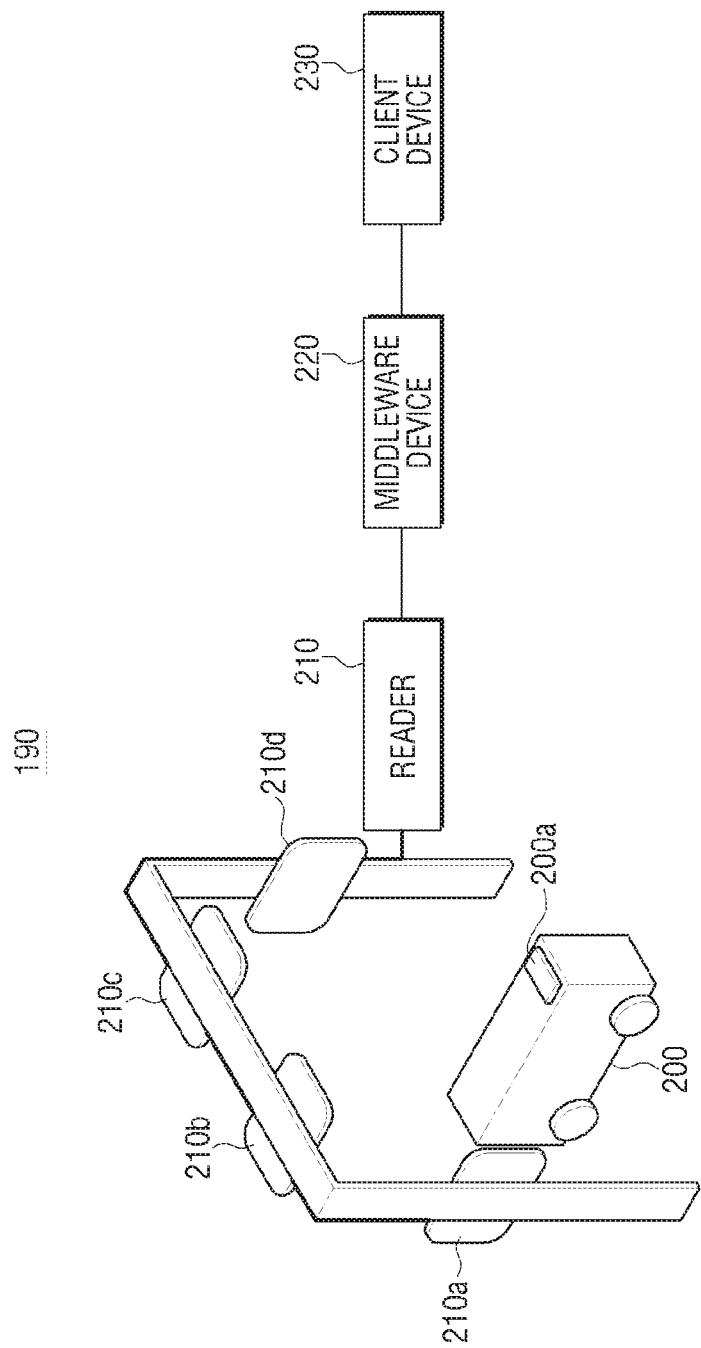
FIG. 2 is a diagram of an information processing system according to a second exemplary embodiment of the present disclosure.

FIG. 2 is a diagram of an information processing system 190 according to a second exemplary embodiment of the present disclosure.

As illustrated in FIG. 2, the information processing system 190 according to the second exemplary embodiment of the present disclosure may include some or all of a tag 200*a*, a reader 210 connected to a plurality of antennas 210*a* to 210*d*, a middleware device 220, and a client device 230.

The system 190 of FIG. 2 is different from the system 90 of FIG. 1 in terms of the antennas 210*a* to 210*d*. Accordingly, only the difference will be described based on this.

The plurality of antennas 210*a* to 210*d* illustrated in FIG. 2 may transmit a radio signal in various forms according to control of the reader 210. For example, the plurality of antennas 210*a* to 210*d* may transmit a linear polarization signal as a radio signal. Accordingly, the antennas 210*a* to 210*d* may be directed in different directions and may simultaneously transmit a plurality of radio signals. Accordingly, the reader 210 or the middleware device 220 may select highest receiving sensitivity or receiving sensitivity with a weight applied thereto and may use the selected receiving sensitivity to determine misrecognition of the tag 200*a*.

Under control of the reader 210, the plurality of antennas 210*a* to 210*d* may be installed so as to be directed in the same direction or to be directed with different distances. Accordingly, the reader 210 or the middleware device 220 may measure and use receiving sensitivity of tag information items that are sequentially input with a predetermined time interval through the plurality of antennas 210*a* to 210*d*.

In addition, two of the plurality of antennas 210*a* to 210*d* may transmit a radio signal of linear polarization and the remaining two antennas may transmit a radio signal of circular polarization so as to recognize approach of the tag 200*a* through circular polarization and to achieve accurate measurement using the radio signal of linear polarization.

As described above, it may be possible to process various information items according to a system established using the plurality of antennas 210*a* to 210*d*, and thus an exemplary embodiment of the present disclosure is not particularly limited to a specific system.

However, according to an exemplary embodiment of the present disclosure, the plurality of antennas 210*a* to 210*d* may be directed in the same direction and may simultaneously transmit radio signals at a position of the same distance. In other words, according to control of the reader 210, the plurality of antennas 210*a* to 210*d* may simultaneously transmit radio signals to the tag 200*a* and may simultaneously transmit radio signals after a predetermined time period elapses.

Accordingly, the reader 210 may measure receiving sensitivity of the tag information items that are simultaneously received and provide the measured value to the middleware device 220 or may delete a minimum value and a maximum value and transmit only two intermediate values to the middleware device 220.

In the above case, when receiving sensitivity of the two intermediate values are identical to two pre-stored values of receiving sensitivity, the middleware device 220 may provide related tag information to the client device 230 so as to process physical distribution.

Figure 3:
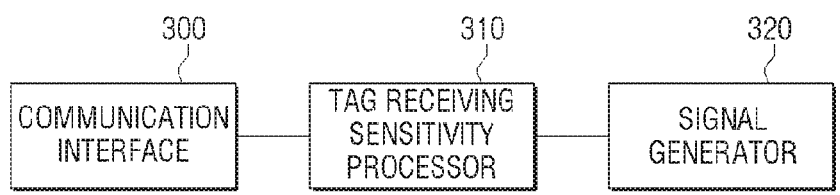
FIG. 3 is a block diagram of the readers illustrated in FIGS. 1 and 2, according to a first exemplary embodiment of the present disclosure.

FIG. 3 is a block diagram of the readers 110 and 210 illustrated in FIGS. 1 and 2, according to a first exemplary embodiment of the present disclosure.

For convenience of description, with reference to FIG. 3 together with FIG. 1, the reader 110 according to the first exemplary embodiment of the present disclosure may include some or all of a communication interface 300, a tag receiving sensitivity processor 310, and a signal generator 320.

Here, inclusion of some or all of components may indicate some components such as the communication interface 300 are omitted to constitute a system or some components such as the signal generator 320 are integrated with the tag receiving sensitivity processor 310, and the case in which all components are included will be described for sufficient understanding of the present disclosure.

The communication interface 300 may be connected to the antenna 110*a* of FIG. 1 and may output a radio signal generated by the signal generator 320 under control of the tag receiving sensitivity processor 310. In addition, the communication interface 300 may receive tag information as a response signal of the transmitted radio signal. Although sufficiently described above, the communication interface 300 may perform an operation for establishing receiving sensitivity related data according to change in a distance of the middleware device 120. For example, in response to a distance from the tag 100*a* being changed, a radio signal may be transmitted to a firmware according to a measuring method set as default or a user request input to the tag receiving sensitivity processor 310 from an external source, and tag information may be received as a response signal to the radio signal.

According to the first exemplary embodiment of the present disclosure, the tag receiving sensitivity processor 310 may execute a controlling function and a receiving sensitivity processing function using one program and may execute only some functions in terms of software. In other words, when the tag 100a is within a communication radius, the tag receiving sensitivity processor 310 may provide a radio signal generated by the signal generator 320 to the communication interface 300 and transmit the radio signal through the antenna 110a. In this case, the radio signal generated by the signal generator 320 may correspond to a signal of 900 MHz.

In addition, the tag receiving sensitivity processor 310 may measure receiving sensitivity of tag information that is received in response to the transmitted radio signal. To this end, the tag receiving sensitivity processor 310 may include a firmware that is capable of measuring the receiving sensitivity. The receiving sensitivity may be measured as received signal strength indication (RSSI). In other words, a signal reflected by the tag 100a may be formed by putting ID information of the tag 100a in a carrier frequency signal of the reader 110, that is, may be modulated and transmitted, and in this process, a back-scattering signal may be provided to the reader 110, and the reader 110 may demodulate received information and interpret ID information of the tag 100a. Assuming this, receiving signal intensity according to an exemplary embodiment of the present disclosure refers to a power amount of the modulation back scattering signal received by the reader 110. According to an exemplary embodiment of the present disclosure, receiving sensitivity of tag information, that is, a power amount of the modulation back scattering signal may be measured using time of arrival (TOA) information. In other words, a difference between time for transmitting a radio signal and time for receiving tag information may be calculated as a distance and may be used.

Then, the tag receiving sensitivity processor 310 may perform control to provide data related to the measured receiving sensitivity to the middleware device 120 of FIG. 1 through the communication interface 300.

The signal generator 320 may include an oscillator for generating a signal. In other words, the signal generator 320 may generate a clock signal in which clocks are repeated at a predetermined period, and in the case of an active RFID according to an exemplary embodiment of the present disclosure, the signal generator 320 may generate a signal of 900 MHz. The generated radio signal may be provided in response to a request of the tag receiving sensitivity processor 310.

Figure 4:
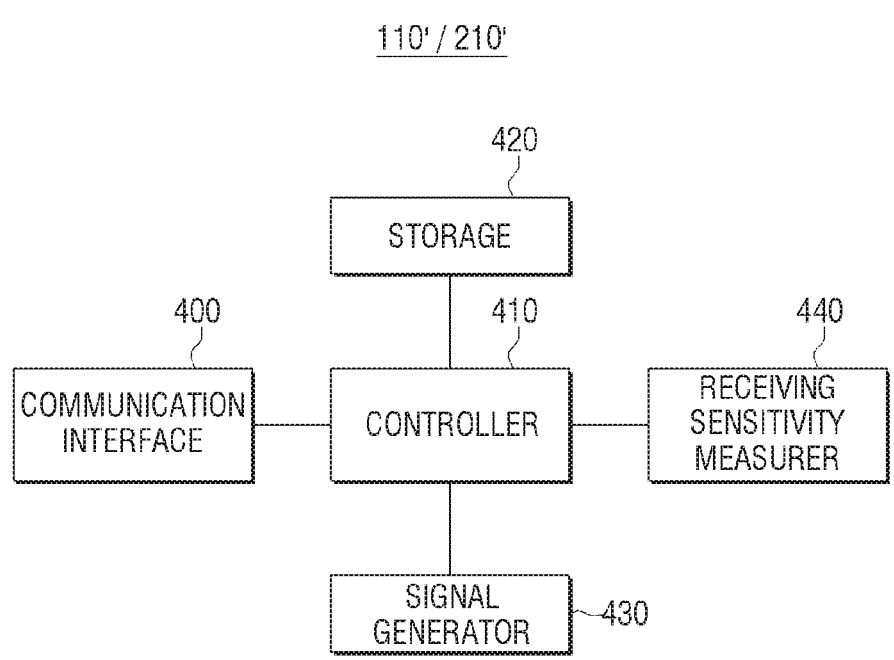
FIG. 4 is a block diagram of readers illustrated in FIGS. 1 and 2, according to a second exemplary embodiment of the present disclosure.

FIG. 4 is a block diagram of readers illustrated in FIGS. 1 and 2, according to a second exemplary embodiment of the present disclosure.

For convenience of description, with reference to FIG. 4 together with FIG. 1, the reader 110' according to the second exemplary embodiment of the present disclosure may include some or all of a communication interface 400, a controller 410, a storage 420, a signal generator 430, and a receiving sensitivity measurer 440.

The communication interface 400 and the signal generator 430 of the reader 110' illustrated in FIG. 4 are not largely differently from the communication interface 300 and the signal generator 320 of FIG. 3, and thus a detailed description of the communication interface 400 and the signal generator 430 will be substituted with that of the communication interface 300 and the signal generator 320.

In addition, it may be deemed that the controller 410, the storage 420, and the receiving sensitivity measurer 440 of FIG. 4 perform the same or similar operation as that of the tag receiving sensitivity processor 310 of FIG. 3. However, when the tag receiving sensitivity processor 310 of FIG. 3 processes data in terms of software, it may be deemed that the controller 410, the storage 420, and the receiving sensitivity measurer 440 of FIG. 4 are configured and perform an operation in terms of hardware.

In other words, in response to the tag 100a of FIG. 1 being recognized, the controller 410 may transmit the radio signal generated by the signal generator 430 to the antenna 110a through the communication interface 400. In addition, tag information that is received in response to the radio signal may be provided to the receiving sensitivity measurer 440. In addition, the controller 410 may receive a measured value measured by the receiving sensitivity measurer 440 and control the communication interface 400 to transmit the measured value to the middleware device 120. In this process, the controller 410 may temporally store internally processed information in the storage 420.

Figure 7:
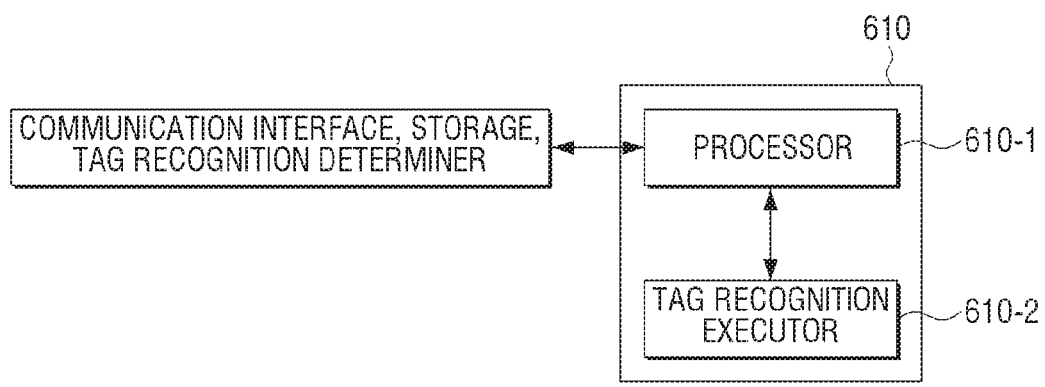
FIG. 7 is a diagram illustrating an example of a detailed structure of a controller illustrated in FIG. 6.

Needless to say, the controller 410 may include a processor and a memory (refer to FIG. 7). Through this, a program for measurement of receiving sensitivity may be loaded from the receiving sensitivity measurer 440 and stored in an internal memory at an initial driving time point, i.e., at a booting time point of the system 90 and then may be used, thereby enhancing data processing velocity as much compared with the above case.

Except for this, the controller 410 is not largely different from an operation of the tag receiving sensitivity processor 310 of FIG. 3 and is not largely different from the operation of the reader 110 described with reference to FIG. 1, and thus a detailed description of the controller 410 will be substituted with that of the tag receiving sensitivity processor 310 and the reader 110.

In other words, a firmware stored in the receiving sensitivity measurer 440, that is, a firmware for measuring receiving sensitivity may measure and output receiving sensitivity of tag information according to distance change and may also measure and output receiving sensitivity of tag information that is received in real time or according to time variation using the tag information of the tag 100a recognized in an actual physical distribution environment.

The former measurement of receiving sensitivity according to distance change is a procedure for establishing data information by the middleware device 120, and the latter measurement of receiving sensitivity according to time variation is a procedure for managing physical distribution of materials that are input and output to and from a warehouse via comparison with pre-stored data. That is, misrecognition of the tag 100a may be accurately determined so as to stably manage tag information.

Figure 5:
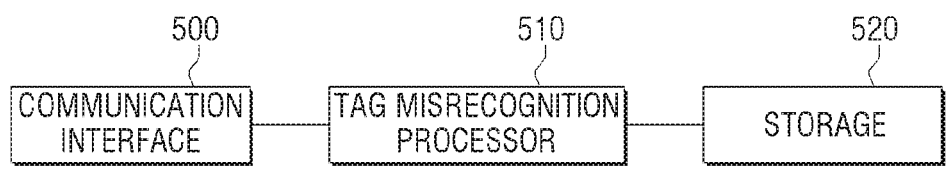
FIG. 5 is a block diagram of the middleware devices illustrated in FIGS. 1 and 2, according to a first exemplary embodiment of the present disclosure.

FIG. 5 is a block diagram of the middleware devices 120 and 220 illustrated in FIGS. 1 and 2, according to a first exemplary embodiment of the present disclosure.

For convenience of description, with reference to FIG. 5 together with FIG. 1, the middleware device 120 according to the first exemplary embodiment of the present disclosure may be a relay device connected between the reader 110 and the client device 130 and may include some or all of a communication interface 500, a tag misrecognition processor 510, and a storage 520.

Here, inclusion of some or all of components may indicate that some components such as the communication interface 500 and the storage 520 are omitted or some components such as the communication interface 500 and the storage 520 are integrated with the tag misrecognition processor 510, and the case in which all components are included will be described for sufficient understanding of the present disclosure.

The communication interface 500 may communicate with the reader 110 and the client device 130 of FIG. 1. In other words, when the reader 110 receives data related to receiving sensitivity for establishing data, the communication interface 500 may transmit the data to the tag misrecognition processor 510 so as to store the data in the storage 520. Needless to say, the data for data establishment may correspond to a measurement value obtained by measuring receiving sensitivity of tag information that is pre-received according to distance change. In addition, the communication interface 500 may receive receiving sensitivity related data and transmit the receiving sensitivity related data to the tag misrecognition processor 510 using tag information that is received by recognizing the tag 100a by the reader 110 in an actual physical distribution environment.

Then, the tag misrecognition processor 510 may classify and store receiving sensitivity, which is received by recognizing the tag 100a from the communication interface 500 in an actual physical distribution environment, in terms of time, for example, in the storage 520. Needless to say, the classifying and storing processes may be omitted.

The tag misrecognition processor 510 may sequentially compare the receiving sensitivity that is classified in terms of time with receiving sensitivity that is stored in the storage 520 based on distance change. In other words, when first receiving sensitivity according to distance change and first receiving sensitivity according to time variation are compared and are identical to each other, second receiving sensitivity according to distance change and second receiving sensitivity according to time variation are re-compared. In this manner, when a plurality of receiving sensitivities are identical to each other or are within an error range, the tag misrecognition processor 510 may determine that corresponding tag information is normally recognized and control the communication interface 500 to provide the corresponding tag information to the client device 130. As described above, a comparing process for determining whether a plurality of receiving sensitivities are identical to each other may be referred to as a pattern recognition process according to an exemplary embodiment of the present disclosure. Based on the above description, the tag misrecognition processor 510 may include a comparer.

The storage 520 may store receiving sensitivity related data that is received for data establishment under control of the tag misrecognition processor 510. In this case, the stored data may be based on distance change. In addition, the storage 520 may classify and store data related to receiving sensitivity, which is received according to time variation in an actual physical distribution environment, in terms of time under control of the tag misrecognition processor 510. In addition, receiving sensitivity related data items that are stored in distance change and time variation may be output in response to a request of the tag misrecognition processor 510.

Figure 6:
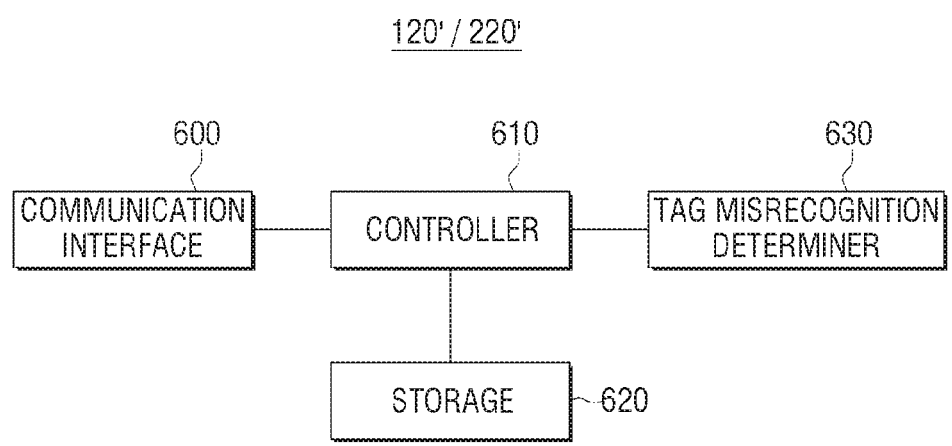
FIG. 6 is a block diagram of middleware devices illustrated in FIGS. 1 and 2, according to a second exemplary embodiment of the present disclosure.

FIG. 6 is a block diagram of middleware devices illustrated in FIGS. 1 and 2, according to a second exemplary embodiment of the present disclosure. FIG. 7 is a diagram illustrating an example of a detailed structure of a controller 610 illustrated in FIG. 6.

For convenience of description, with reference to FIGS. 6 and 7 together with FIG. 1, the middleware device 120' according to the second exemplary embodiment of the present disclosure may include some or all of a communication interface 600, a controller 610, a storage 620, and a tag misrecognition determiner 630.

Here, inclusion of some or all of components may indicate that the controller 610 of FIG. 6 has a structure of FIG. 7, the tag misrecognition determiner 630 is omitted and configured, or the tag misrecognition determiner 630 is integrated with other components such as the controller 610, and the case in which all components are included will be described for sufficient understanding of the present disclosure.

For example, when the controller 610 and the tag misrecognition determiner 630 are integrated with each other in FIG. 6, the controller 610 and the tag misrecognition determiner 630 are embodied in terms of software like the tag misrecognition processor 510 of FIG. 5, and when the controller 610 includes a processor 610-1 and a tag recognition executor 610-2 as illustrated in FIG. 7, this means that the controller 610 is embodied in terms of hardware.

The communication interface 600 and the storage 620 illustrated in FIG. 6 are not largely different from the communication interface 500 and the storage 520 of FIG. 5, and thus a detailed description of the communication interface 600 and the storage 620 will be substituted with that of the communication interface 500 and the storage 520.

On the other hand, the controller 610 is responsible for control of all components in the middleware device 120. In other words, in response to data about receiving sensitivity of tag information for data establishment, being received from the reader 110 of FIG. 1 through the communication interface 600, the received data may be stored in the storage 620. In this case, receiving sensitivity according to distance change may be classified and stored. In addition, in response to tag information being received by recognizing the tag 100a in an actual physical distribution environment, a measured value of receiving sensitivity that is measured by the reader 110 using the received tag information may be received through the communication interface 600 and stored in the storage 620 in terms of time.

In addition, the controller 610 may call data, that is, receiving sensitivity according to distance change and receiving sensitivity classified and stored in terms of time, which are stored in the storage 620, and perform control to provide the data to the tag misrecognition determiner 630 and to perform a comparison operation between the receiving sensitivities. The controller 610 may receive the result obtained by comparison in this manner from the tag misrecognition determiner 630. As the result, when normal recognition is determined, the controller 610 may control the communication interface 600 to provide corresponding tag information to the client device 130.

Under the structure illustrated in FIG. 6, the controller 610 may load a program stored in the tag misrecognition determiner 630 in an internal memory at an initial driving time point, i.e., at a booting time point of the system 90 so as to perform the above operation, as illustrated in FIG. 7. In FIG. 7 the tag recognition executor 610-2 may be embodied in the form of a tag recognition program stored in a memory such as a RAM.

Accordingly, the processor 610-1 of FIG. 7 may call receiving sensitivity related data items according to distance change and time variation, which is stored in the storage 620 of FIG. 6, and execute the internal tag recognition executor 610-2 to perform a comparison operation. In addition, as the result, when normal recognition is determined, the controller 610 may control the communication interface 600 to provide tag information received in an actual physical distribution environment to the client device 130. In addition, as the result, when misrecognition is determined, corresponding tag information may be deleted. That is, it may be deemed that tag information to be compared with established receiving sensitivity related data is deleted. Based on this point, it is deemed that the established receiving sensitivity related data is a reference value.

As described above, various modification examples of the readers 110 and 110' and the middleware devices 120 and 120' according to the exemplary embodiment of the present disclosure have been described with reference to FIGS. 3 to 7. As sufficiently described above, it may be possible to configure any SW module as a portion of software in terms of hardware, and this may be selectable by a system designer in consideration of various economical aspects, and thus devices according to an exemplary embodiment of the present disclosure is not particularly limited to whether the device is configured in terms of hardware or software.

Figure 8:
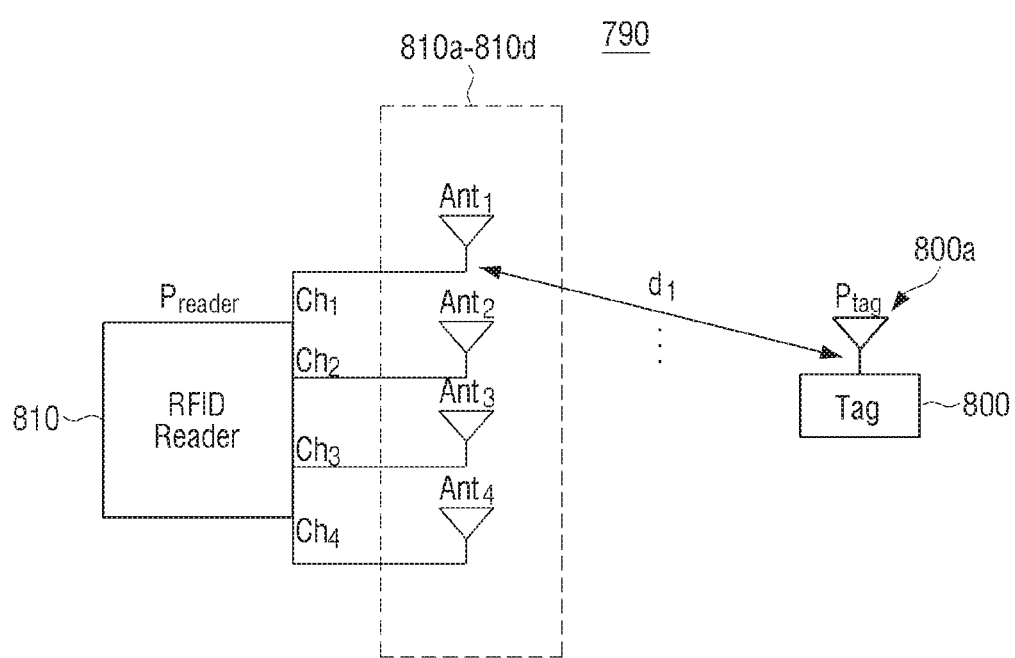
FIG. 8 is a diagram for explanation of a signal power level of a tag in an RFID system.

FIG. 8 is a diagram for explanation of a signal power level of a tag in an RFID system 790.

As illustrated in FIG. 8, the RFID system 790 may include an RFID tag 800 and an RFID reader 810, the RFID tag 800 may include one antenna 800a, and the RFID reader 810 may include a plurality of antennas 810a to 810d.

The RFID tag 800 may be attached to each truck and physical distribution related information, e.g., information about a material code, a product line, and a quantity may be recorded in the RFID tag 800 and input to a warehouse. The physical distribution related information may be transmitted to the RFID reader 810 installed at a gate in the warehouse. When the RFID tag 800 moved through a moving path is defined as a normal recognized tag and a tag that is positioned at a right or left side or passes by the path so as to be on standby to be moved, it may be seen that two RFID tags 800 are simultaneously recognized using a conventional method by a tag recognition number of times.

In order to overcome this problem, according to an exemplary embodiment of the present disclosure, a normal tag may be identified by applying a filtering algorithm with levels and recognition patterns of tag information receiving sensitivity.

As illustrated in FIG. 8, basically, the RFID reader 810 may include 4 channel terminals and antennas 810a to 810d may be connected to the respective terminals. Unique information containing an ID of the RFID tag 800 may be transmitted to a single/a plurality of adjacent antennas 810a to 810d, and in this case, a signal power level of a tag transmitted to each channel of the RFID reader 810 may be represented according to [Equation 1] below.

$$P_{tag} = P_{reader} \times G_{reader} \times G_{tag} \times \left(\frac{\lambda}{4\pi d}\right)^2 \quad \text{[Equation 1]}$$

Here, Preader is power supplied by a reader, Greader is a reader antenna gain, Gtag is a tag antenna gain, λ is a wavelength of an operating frequency, and d is a distance between a reader antenna and a tag.

Sensitivity of tag (information) received by a reader channel may be dependent upon intensity and antenna gain of an RF wave output from the RFID reader 810, tag antenna gain, a distance between a reader antenna and a tag, and an RF operating frequency, and connection cable loss between a reader channel and an antenna may be finally compensated for so as to determine relative intensity of receiving sensitivity at each channel. Tag information collected by each channel of the RFID reader 810 may be transmitted to the middleware device 120 of FIG. 1 and receiving sensitivity for each tag may be classified in terms of time.

Here, in consideration of a complex factory environment, there is another multi-path environment in addition to a radio wave path that is uniquely present in a free space. This is because a reflection path for roundabout reach is generated by a reflector such as a ground, a ceiling, a sidewall, and an internal object around the reader/antenna. Since the amplitudes, phases, and arrival times of radio waves that are received along various paths are different, receiving power may be reinforced or offset by a phase difference. In this regard, when the sum of receiving power of the respective radio wave paths is compensated, power received by the reader may be increased, and when the sum is offset, if a degree thereof is significant, receiving power is low despite a short distance, and thus a tag may not be recognized. Accordingly, abnormally high or low values of an event that occurs at an instantaneous time point in receiving sensitivity data for each time of the tag need to be deleted through a filtering operation. Based on this point, the middleware device 120 or the RFID reader 810 of FIG. 1 may remove this noise signal.

As shown in [Equation 1] above, when the RFID reader 810 is fixed at a loading path and receiving sensitivity of a tag that normally passes is measured as a distance from the RFID tag 800 is changed, receiving sensitivity is gradually increased as the RFID tag 800 approaches an antenna of the RFID reader 810 while a predetermined level or more is maintained, and then the receiving sensitivity is gradually reduced after the RFID tag 800 passes by the antenna. When a filtering algorithm obtained by considering ±error is applied based on the above receiving sensitivity level (an appropriate range between minimum and maximum) and pattern properties of the normal tag, a misrecognized tag may be identified. The above sequential operation will be continuously described hereinafter.

Figure 9A:
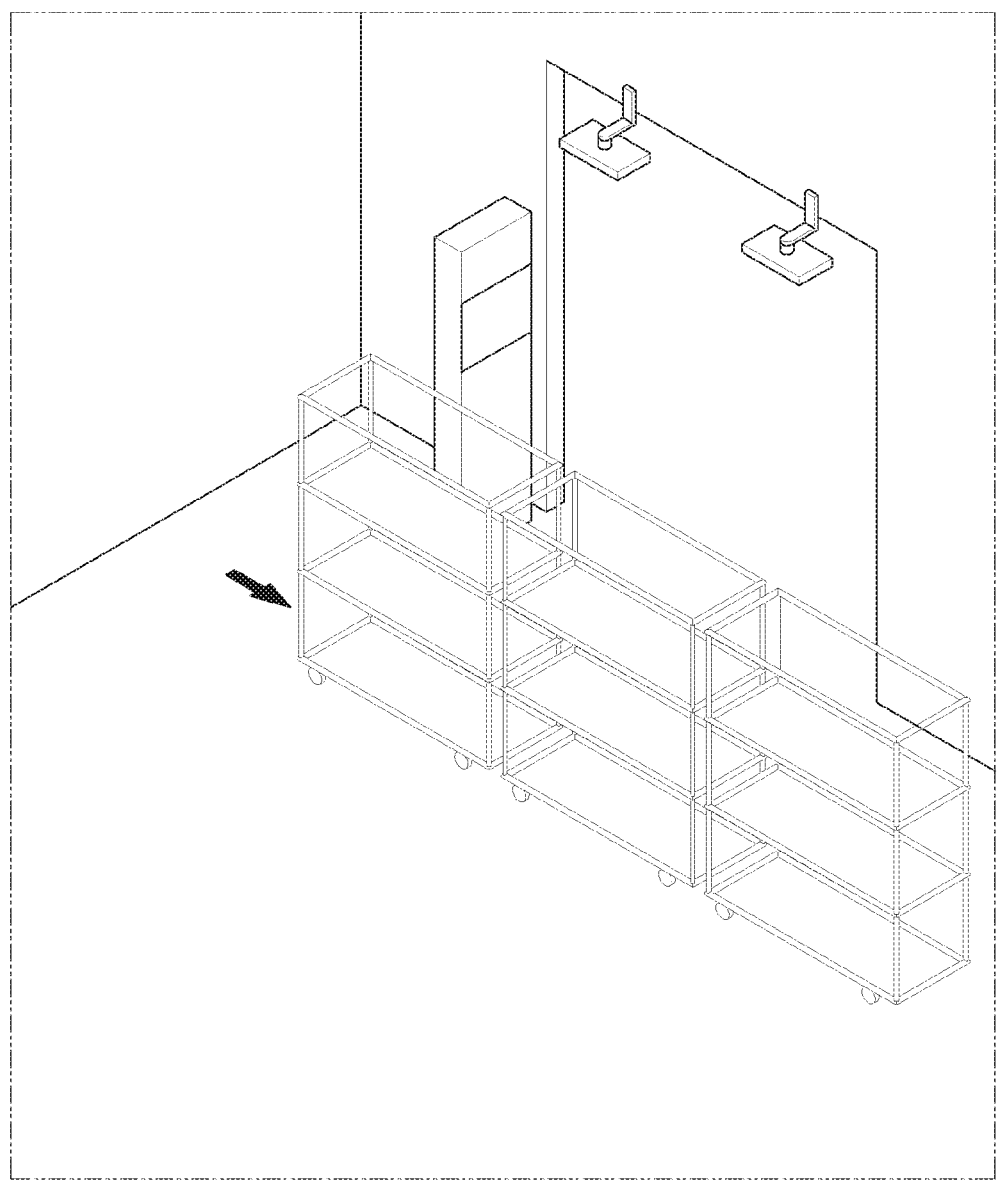
FIGS. 9A and 9B are diagram of physical distribution environment scenarios for the system of FIG. 8.
Figure 9B:
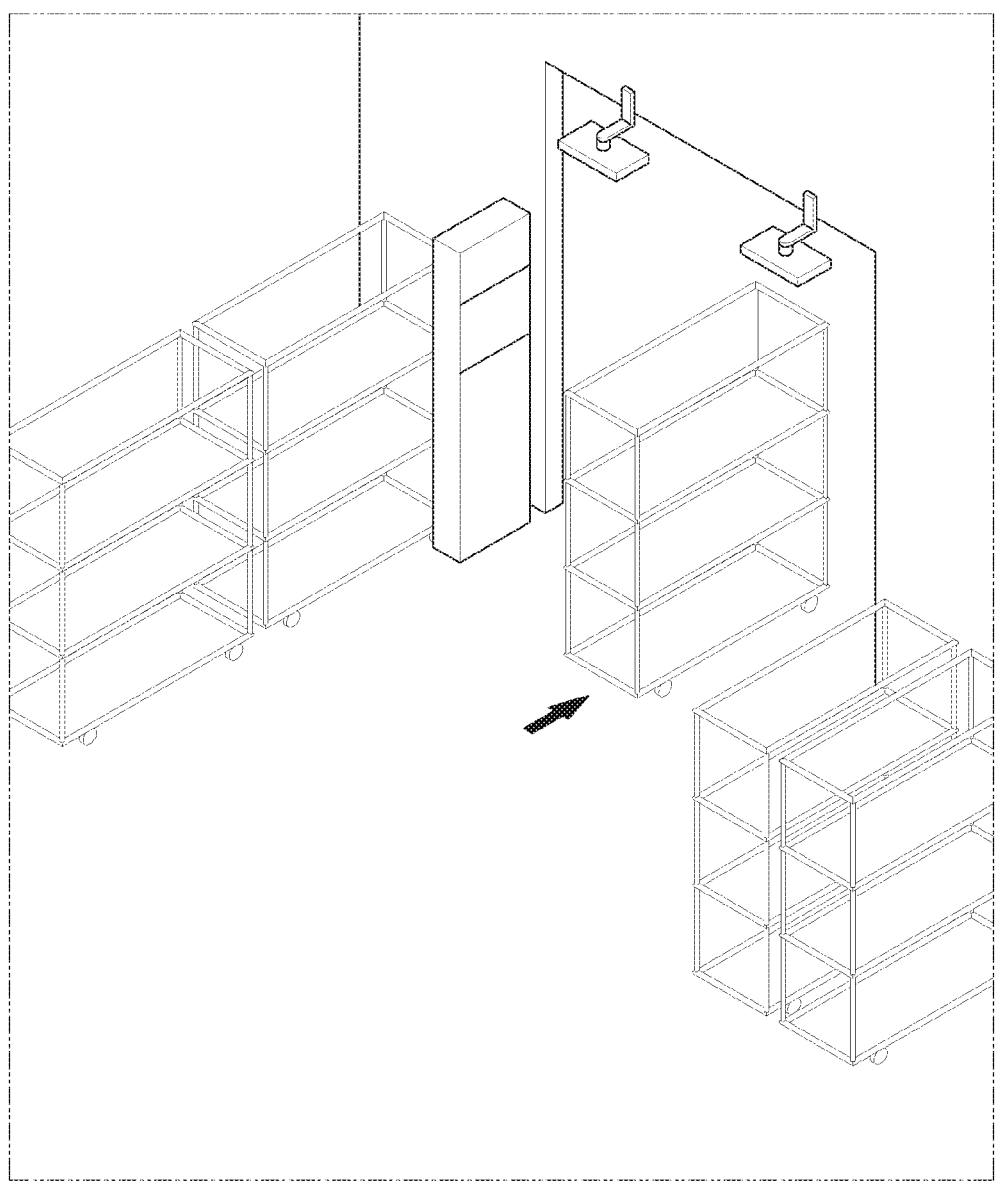
Figure 10A:
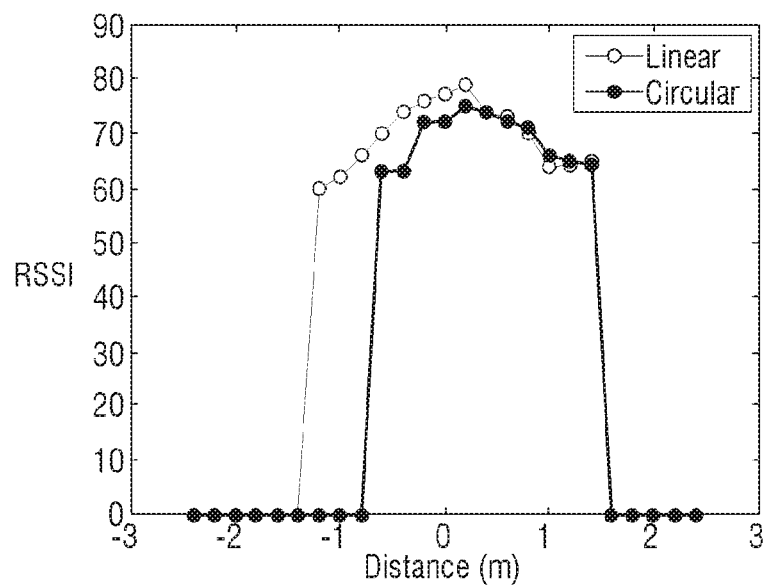
FIGS. 10A and 10B are graphs showing comparison between normal recognition and misrecognition data according to the scenarios of FIGS. 9A and 9B.
Figure 10B:
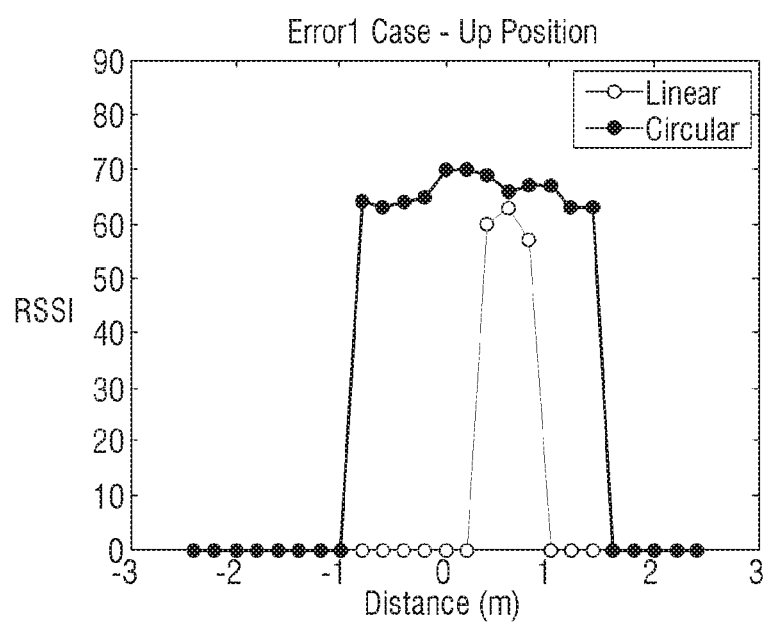

FIGS. 9A and 9B are diagram of physical distribution environment scenarios for the system of FIG. 8. FIGS. 10A and 10B are graphs showing comparison between normal recognition and misrecognition data according to the scenarios of FIGS. 9A and 9B.

In the case of an actual physical distribution environment, in order to check the receiving sensitivity properties of the tag, the RFID the antenna 110a is installed in a center of an upper portion of a door, as illustrated in FIG. 1. In addition, with respect to types of antennas with linear and circular polarization properties, in the case of misrecognition like in a conventional case including two cases, e.g., the case in which the truck 100 with the tag 100a attached thereto passes by a gate as illustrated in FIG. 9A or the case in which the truck 100 with the tag 100a attached thereto normally passes through a gate as illustrated in FIG. 9B, measured receiving sensitivity results may be analyzed and summarized.

As illustrated in FIG. 9B, when a tag normally passes through a gate, a recognition pattern in which receiving sensitivity is increased and reduced is exhibited at a time point in which the tag passes through the gate with respect to both linear/circular antennas, and a maximum/minimum level difference may be, for example, as large as 20 in a linear case and may be, for example, as large as 15 in a circular case. However, as illustrated in FIG. 9A, as a conventional case, when a tag passes by a gate, if a circular polarization antenna is used, similar receiving sensitivity patterns and levels may be achieved to the above case. On the other hand, when a linear polarization antenna is used, a tag is recognized immediately below a lower end of an antenna, but a maintenance time thereof is short, and a receiving sensitivity level is also similar to the above case.

In summary of the above result, it is advantageous to enhance a recognition rate using an antenna with circular polarization properties in order to maintain a conventional determining method by a tag recognition number of times. Needless to say, conventionally, a reflection type sensor is installed at a gate in order to prevent misrecognition of an adjacent tag and a reader is operated only when passing through a gate such that a tag passing around the gate is not recognized.

On the other hand, in order to accurately identify only a tag that normally passes through a gate, tag receiving sensitivity is determined for each time using a linear polarization antenna and then a level and recognition pattern algorithm may be applied. This is because, when the same passing velocity is assumed, in the case of misrecognition of FIG. 10B, a time axis period in which a data pattern is present is observed to be ¼ to ⅕ narrower and a level is also observed to be lower than the case of FIG. 10A. When an object is slight deviated from a gate, a level is sharply reduced, and thus the object may be easily determined.

In addition, when an object passes through a gate, a reflection type sensor is turned on and a tag passing by the gate is frequently misrecognized. In this regard, this problem may also be overcome irrespective of whether a sensor is used by applying a filtering algorithm according to an exemplary embodiment of the present disclosure. In addition, a plurality of tag may be recognized while passing in opposite directions through a gate and recognition of adjacent tags may be excluded.

However, data distributions may be different according to time due to difference in velocity at which an object passes through a gate, and thus an additional pattern needs to be defined in consideration of maximum/minimum passing velocity, and in this case, a receiving sensitivity level may be a main factor for estimation of recognition/misrecognition. To this end, as illustrated in FIG. 2, a level and recognition pattern may be optimized and applied by analyzing normal tag receiving sensitivity according to antenna arrangement at various positions.

The problem in terms of the conventional tag misrecognition case may be overcome by applying the receiving sensitivity filtering algorithm according to an exemplary embodiment of the present disclosure. Tag misrecognition of a truck that passes around a gate may be overcome via a filtering operation by virtue of a short data pattern period and a low level by changing a circular polarization type of existing antenna to a linear polarization type of antenna and analyzing the received receiving sensitivity data.

Misrecognition of a tag positioned around a gate may be easily identified using a filtering algorithm because the tag and polarization are not absolutely matched such that receiving sensitivity is maintained in a low level or is not recognized.

According to the above description, a system may be improved below by enhancing a recognition rate of an RFID tag. First, it may be possible to accurately inquire input/arrangement and histories of materials via input processing computerization of materials with an RFID tag attached thereto so as to remove human error and delay factors. Second, it may be possible to recognize a material list (e.g., a product code, a quantity, and a product line) and positions in real time and to ensure physical distribution visibility so as to perform inventory management. Through this, material preparation and material input instruction may be systematically controlled. Third, it may be possible to lifetime of a tag by analyzing receiving sensitivity data of a normal tag using an algorithm according to the present disclosure, and a defective tag may be easily changed so as to prevent error due to tag misrecognition, thereby realizing system stability.

FIG. 11 is a flowchart illustrating a driving procedure of a reader according to an exemplary embodiment of the present disclosure.

For convenience of description, with reference to FIG. 11 together with FIG. 1, the reader 110 according to an exemplary embodiment of the present disclosure may measure receiving sensitivity of tag information that is received in response to each radio signal transmitted to the tag 100a as a distance from the tag 100a attached to an object, e.g., a truck is changed and provide the measured receiving sensitivity to the middleware device 120 so as to store the receiving sensitivity (S1100).

In addition, when an object approaches the reader 110, the reader 110 may transmit a radio signal to the tag 100a at a time interval and receive tag information in response to the transmitted radio signal (S1110).

Then, the reader 110 may measure receiving sensitivity of a time point for receiving tag information (S1120). To this end, the reader 110 may measure receiving sensitivity using firmware, and in this case, the receiving sensitivity may be receiving signal intensity (RSSI), which has been described above and thus will not be described.

In addition, the reader 110 may provide the measured receiving sensitivity to the middleware device 120 so as to compare the measured receiving sensitivity with stored receiving sensitivity according to distance change (S1130).

Accordingly, the middleware device 120 connected to the reader 110 may compare the receiving sensitivity according to distance change and the measured receiving sensitivity so as to determine tag misrecognition.

Needless to say, it may be possible to perform this operation of the middleware device 120 in the reader 110, and in this case, the middleware device 120 may be operated as one component in the reader 110. For example, the tag receiving sensitivity processor 310 of FIG. 3 may also perform any operation of the middleware device 120.

Figure 12:
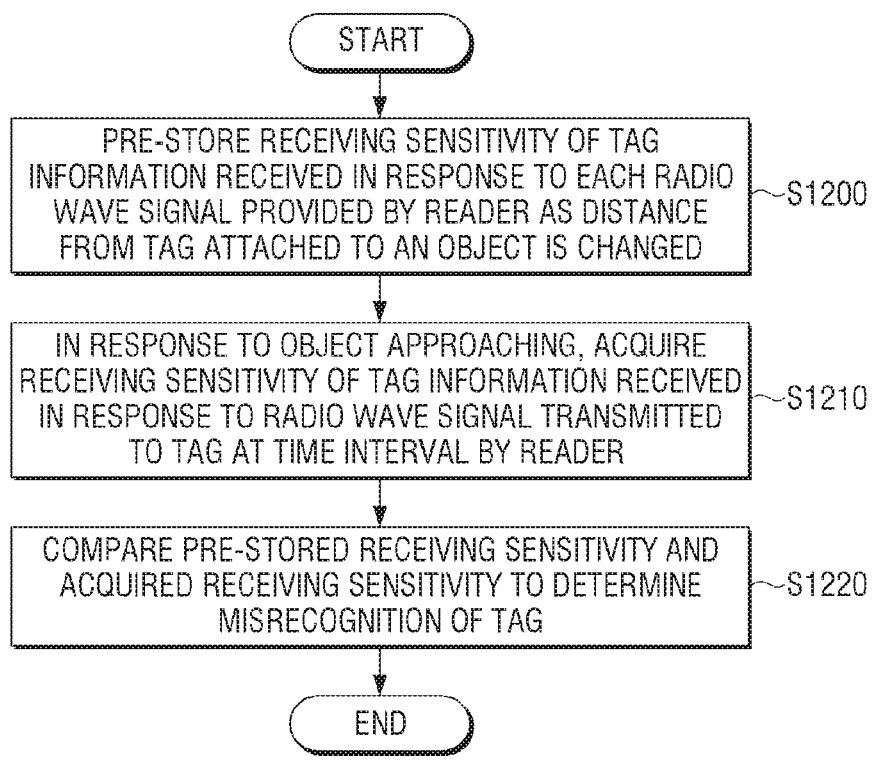
FIG. 12 is a flowchart illustrating a tag misrecognition determining method according to an exemplary embodiment of the present disclosure.

FIG. 12 is a flowchart illustrating a tag misrecognition determining method according to an exemplary embodiment of the present disclosure.

For convenience of description, with reference to FIG. 12 together with FIG. 1, the middleware device 120 according to an exemplary embodiment of the present disclosure may pre-store receiving sensitivity of tag information that is received in response to each radio signal provided by the reader 110 as a distance from the tag 100a attached to an object is changed (S1200).

Then, the middleware device 120 may acquire receiving sensitivity of tag information that is received in response to a radio signal transmitted to the tag 100a at a time interval by the reader 110 when an object approaches the reader 110 (S1210). The receiving sensitivity may be acquired from the reader 110.

In addition, the middleware device 120 may compare the pre-stored receiving sensitivity with the receiving sensitivity acquired in an actual physical distribution environment so as to determine tag misrecognition (S1220).

When normal recognition is determined, the middleware device 120 may transmit the received tag information to the client device 130 of FIG. 1, and when misrecognition is determined, the received corresponding tag information may be deleted.

Figure 13:
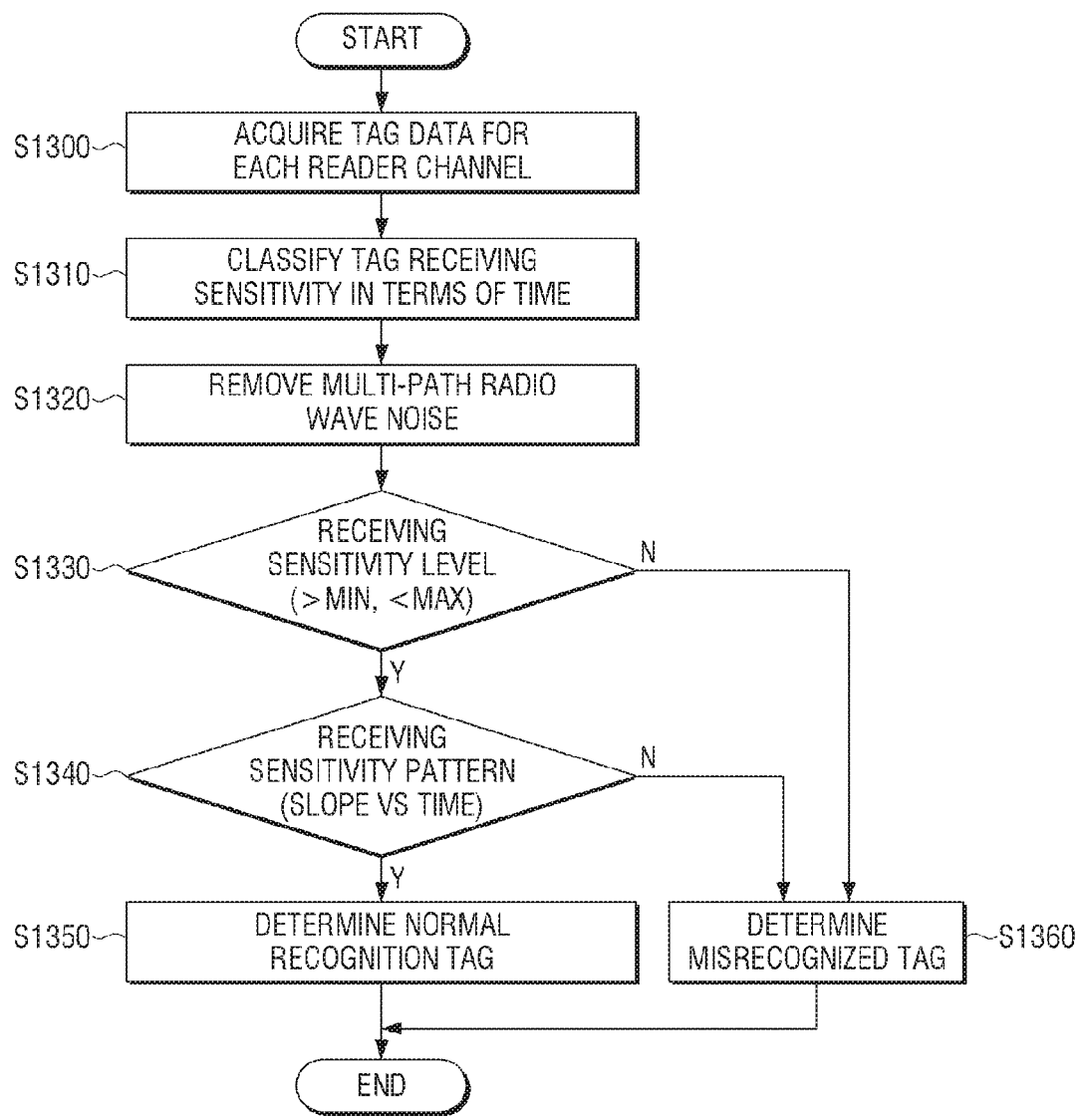
FIG. 13 is a flowchart illustrating a tag misrecognition determining method according to another exemplary embodiment of the present disclosure.

FIG. 13 is a flowchart illustrating a tag misrecognition determining method according to another exemplary embodiment of the present disclosure.

For convenience of description, with reference to FIG. 13 together with FIG. 2, the middleware device 120 according to another exemplary embodiment of the present disclosure may acquire tag data for each reader channel (S1300).

In addition, the middleware device 120 may classify receiving sensitivity of the tag in terms of time (S1310).

Then, the middleware device 120 may remove radio wave noise of a multipath (which is received together during acquisition of tag data) (S1320).

In addition, the middleware device 120 may compare receiving sensitivity levels (S1330), and when the receiving sensitivity level is identical to pre-stored reference receiving sensitivity, receiving sensitivity patterns may be compared (S1340). In other words, it may be deemed that a plurality of sensitivities are sequentially compared based on a time point when the receiving sensitivity level is initially identical to the pre-stored reference receiving sensitivity. In other words, when a receiving sensitivity level corresponding to a specific distance is compared with a receiving sensitivity level corresponding to specific time and then the levels are identical to each other, receiving sensitivity levels may be sequentially compared so as to check receiving sensitivity patterns.

In operation S1340, when the receiving sensitivity patterns are also identical to each other, the middleware device 120 may determine the tag to be normally recognized, and in operation S1330, when the receiving sensitivity levels are not identical to each other, tag misrecognition may be determined (S1360).

In addition, tag information determined as tag normal recognition may be provided to the client device 130 of FIG. 1, and physical distribution may be managed so as to remove misrecognized tag information.

Although all elements constituting the embodiments of the present invention are described as integrated into a single one or to be operated as a single one, the present invention is not necessarily limited to such embodiments. According to embodiments, all of the elements may be selectively integrated into one or more and be operated as one or more within the object and the scope of the present invention. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily understood by those skilled in the art to which the present invention pertains. The computer program may be stored in non-transitory computer readable media such that the computer program is read and executed by a computer to implement embodiments of the present invention.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM) and provided.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A method for determining tag misrecognition by a middleware device that is operated in relation to a reader, the method comprising:
   pre-storing receiving sensitivity of tag information of a tag of an object recognized at different distances from the reader;
   acquiring the receiving sensitivity of tag information of the tag recognized at a preset time interval while the object is passing within a range of the reader; and
   determining misrecognition of the tag by comparing the acquired receiving sensitivity with the pre-stored receiving sensitivity of tag information,
   wherein the determining of misrecognition of the tag comprises determining normal recognition of the taq when a plurality of receiving sensitivities received according to the different distances and pre-stored and a plurality of receiving sensitivities received according to the time interval are identical to each other.

2. The method as claimed in claim 1, wherein the reader transmits radio signals of same strength regardless of the distance and the time interval to the tag.

3. The method as claimed in claim 1, wherein:
   the pre-storing comprises pre-storing the receiving sensitivity for each channel, received according to the distance through a plurality of signal transmitting channels included in the reader;
   the acquiring of the receiving sensitivity of the tag information comprises acquiring the receiving sensitivity for each channel, received according to the time interval through the plurality of signal transmitting channels; and
   the determining of misrecognition of the tag comprises determining misrecognition of the tag by comparing the pre-stored receiving sensitivity for each channel with the acquired receiving sensitivity for each channel.

4. The method as claimed in claim 3, wherein the determining of misrecognition of the tag comprises performing an operation for determining misrecognition of the tag by applying different weights to the respective channels.

5. The method as claimed in claim 1, further comprising:
   classifying the acquired receiving sensitivity in terms of time; and
   removing radio wave noise received together with the tag information,
   wherein the determining of misrecognition of the tag comprises comparing the receiving sensitivity classified in terms of time, from which the radio wave noise is removed, with the pre-stored receiving sensitivity.

6. The method as claimed in claim 1, wherein the pre-stored receiving sensitivity and the acquired receiving sensitivity are transmitted to the middleware device after being measured by the reader.

7. A method for determining tag misrecognition by a middleware device that is operated in relation to a reader, the method comprising:
   pre-storing receiving sensitivity of taq information of a taq of an object recognized at different distances from the reader;
   acquiring the receiving sensitivity of taq information of the taq recognized at a preset time interval while the object is passing within a range of the reader; and determining misrecognition of the taq by comparing the acquired receiving sensitivity with the pre-stored receiving sensitivity of tag information, wherein the pre-storing comprises pre-storing a power amount of a modulation back scattering signal transmitted by the tag in response to a radio signal provided by the reader as the receiving sensitivity, and the modulation back scattering signal is transmitted in an opposite direction to a direction of the radio signal transmitted by the reader.

8. A method for driving a reader that is operated in relation to a middleware device, the method comprising:

measuring, by a reader, receiving sensitivity of tag information of a tag of an object recognized at different distances from the reader;

transmitting the measured receiving sensitivity to the middleware device;

measuring, by a reader, the receiving sensitivity of the tag information of the tag recognized at a preset time interval while the object is passing within a range of the reader; and transmitting the receiving sensitivity measured according to the preset time interval to the middleware device for comparison with measured receiving sensitivity according to the different distances in order to determine misrecognition of the tag, wherein a radio signal transmitted to the tag from the reader is a linear polarization signal for the measuring of the receiving sensitivity.

9. The method as claimed in claim 8, wherein the reader transmits radio signals of same strength regardless of the distance and the time interval to the tag for the measuring of the receiving sensitivity.

10. The method as claimed in claim 8, wherein:

a radio signal transmitted to the tag for the measuring of the receiving sensitivity based on the distance and the time interval is transmitted through a plurality of signal transmitting channels included in the reader; and the tag information is received as a response signal to the transmitted radio signal through the plurality of signal transmitting channels.

11. A middleware device operated in relation to a reader, the middleware device comprising:

a storage configured to pre-store receiving sensitivity of tag information of a tag of an object recognized at different distances from the reader as a reference value;

a communication interface configured to, in response to the object approaching to the reader, acquire the receiving sensitivity of tag information of the tag recognized at a preset time interval; and a tag misrecognition processor configured to compare the acquired receiving sensitivity with the pre-stored reference value to determine misrecognition of the tag, wherein the tag misrecognition processor determines normal recognition when a plurality of receiving sensitivities received according to the different distances and pre-stored as the reference value and a plurality of receiving sensitivities received according to the time interval are identical to each other.

12. The middleware device as claimed in claim 11, wherein the reader transmits radio signals of same strength irrespective of the distance and the time interval to the tag.

13. The middleware device as claimed in claim 11, wherein:

the storage pre-stores the receiving sensitivity for each channel, received according to the distance through a plurality of signal transmitting channels included in the reader;

the communication interface acquires the receiving sensitivity for each channel, received according to the time interval through the plurality of signal transmitting channels; and the tag misrecognition processor compares the acquired receiving sensitivity for each channel and the pre-stored receiving sensitivity for each channel to determine misrecognition of the tag.

14. The middleware device as claimed in claim 13, wherein the tag misrecognition processor performs an operation for determining misrecognition of the tag by applying different weights to the respective channels.

15. The middleware device as claimed in claim 11, wherein:

the communication interface removes radio wave noise received together with the tag information; and the tag misrecognition processor classifies the acquired receiving sensitivity from which the radio wave noise is removed by the communication interface and compares the classified receiving sensitivity in terms of time with the pre-stored receiving sensitivity as the reference value.

16. The middleware device as claimed in claim 11, wherein the pre-stored receiving sensitivity and the acquired receiving sensitivity are each measured by the reader and are transmitted to the middleware device.

17. A middleware device operated in relation to a reader, the middleware device comprising:

a storage configured to pre-store receiving sensitivity of tag information of a tag of an object recognized at different distances from the reader as a reference value;

a communication interface configured to, in response to the object approaching to the reader, acquire the receiving sensitivity of tag information of the tag recognized at a preset time interval; and a tag misrecognition processor configured to compare the acquired receiving sensitivity with the pre-stored reference value to determine misrecognition of the tag, wherein the storage pre-stores a power amount of a modulation back scattering signal which is transmitted by the tag in response to a radio signal transmitted by the reader as the receiving sensitivity, and the modulation back scattering signal is transmitted in an opposite direction to a direction of the radio signal transmitted by the reader.

* * * * *